Figure 1:
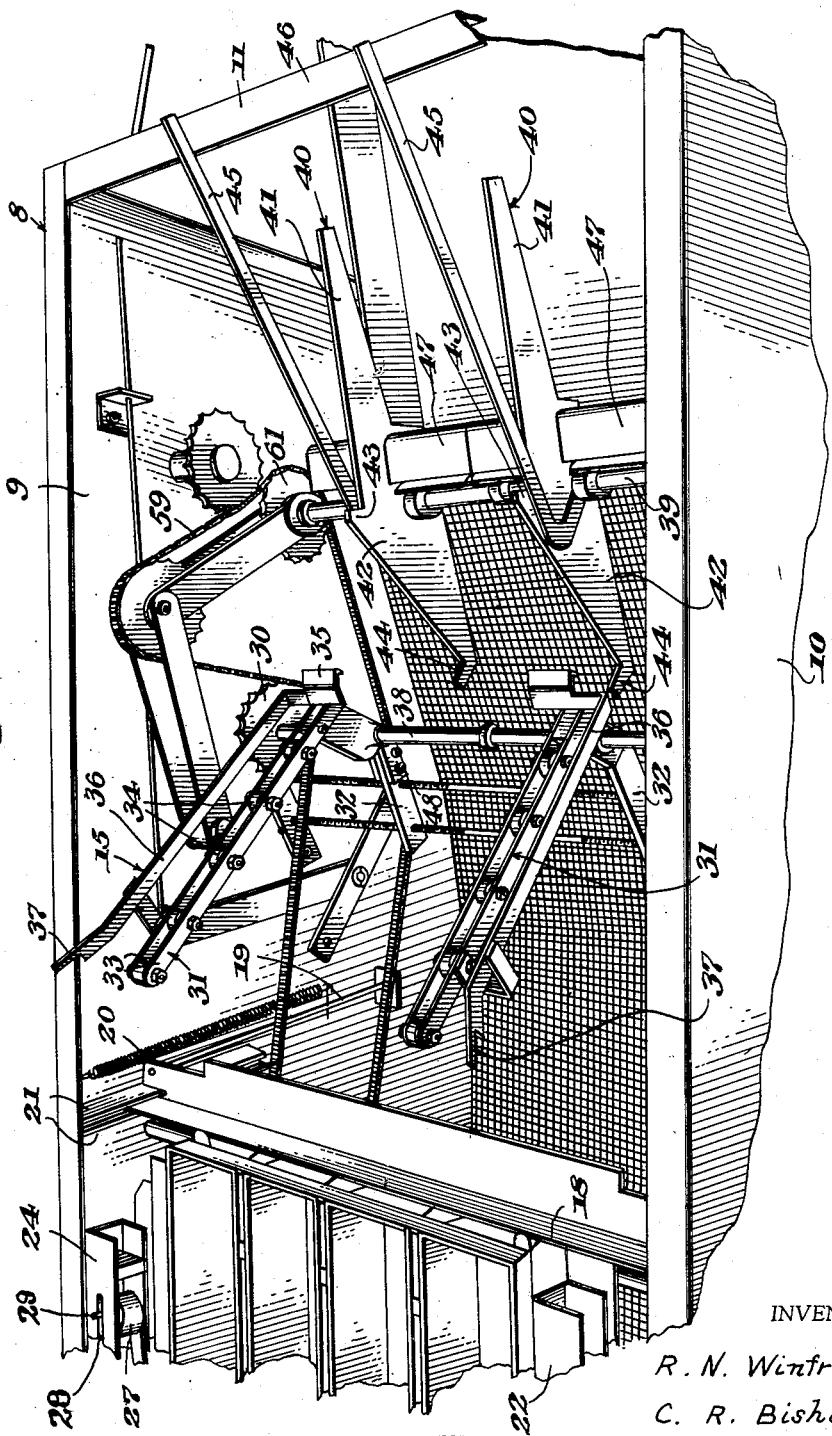

July 6, 1954

R. N. WINFREE ET AL 2,682,961

DEPANNING MACHINE

Filed Oct. 6, 1950

4 Sheets-Sheet 1

INVENTORS
R. N. Winfree +
C. R. Bishop
BY Young, Emery & Thompson
ATTORNEYS

July 6, 1954  R. N. WINFREE ET AL  2,682,961
DEPANNING MACHINE
Filed Oct. 6, 1950  4 Sheets-Sheet 2
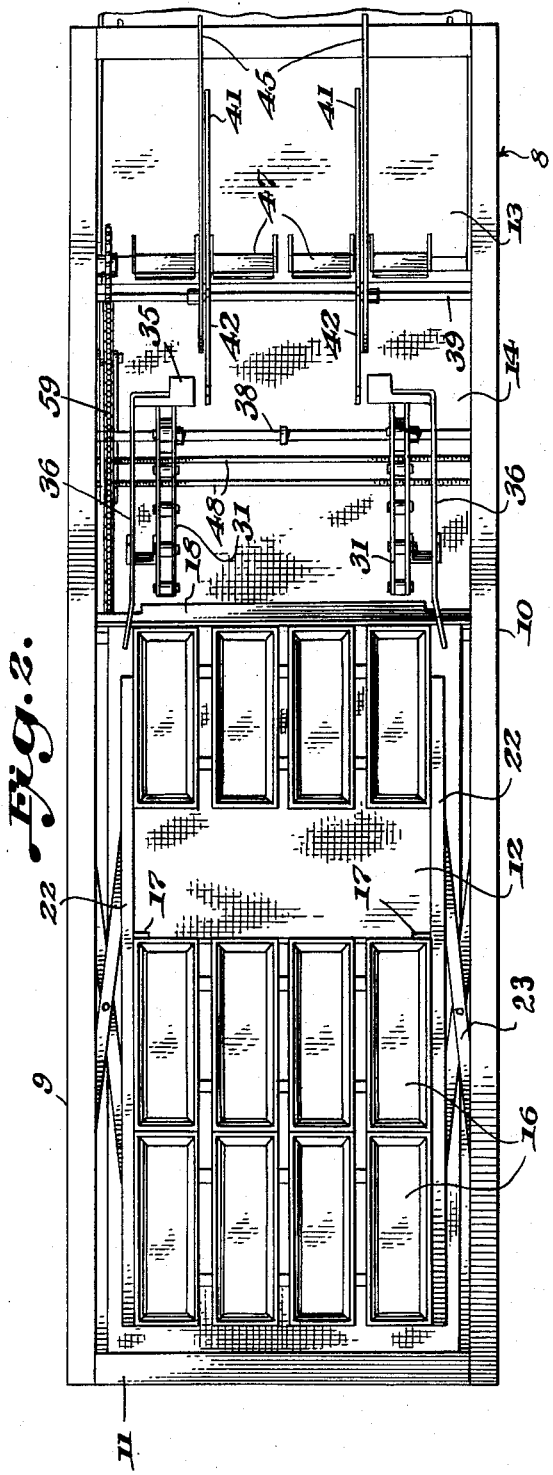
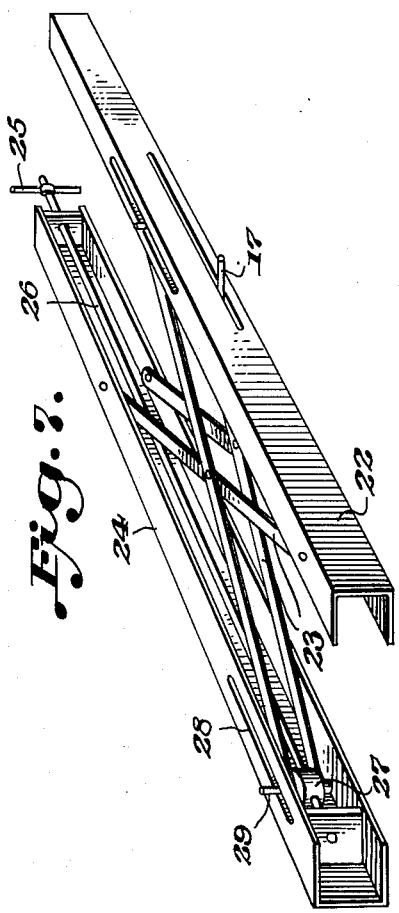
INVENTORS
R. N. Winfree &
C. R. Bishop
BY
ATTORNEYS

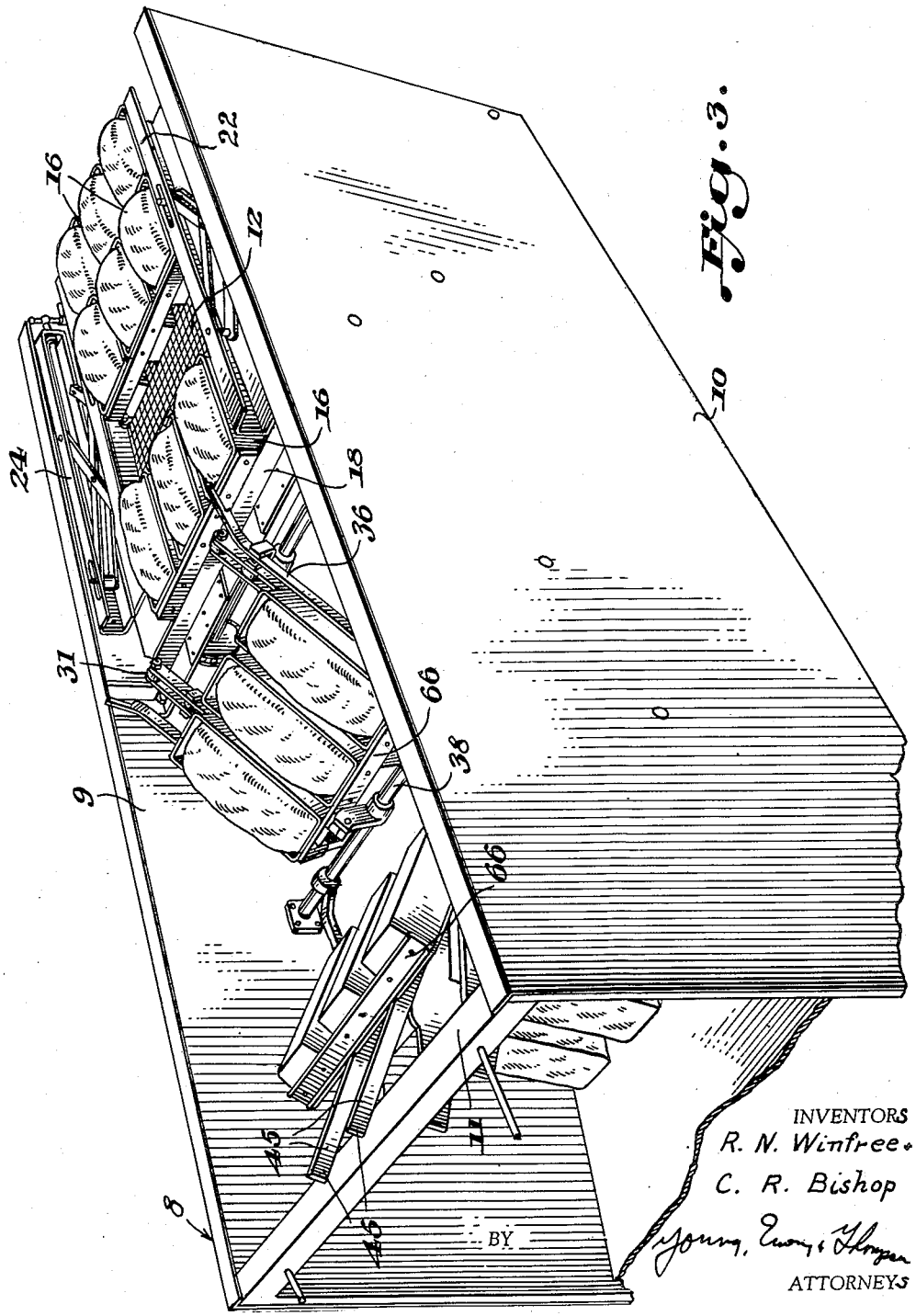

July 6, 1954
R. N. WINFREE ET AL
2,682,961
DEPANNING MACHINE
Filed Oct. 6, 1950
4 Sheets-Sheet 4
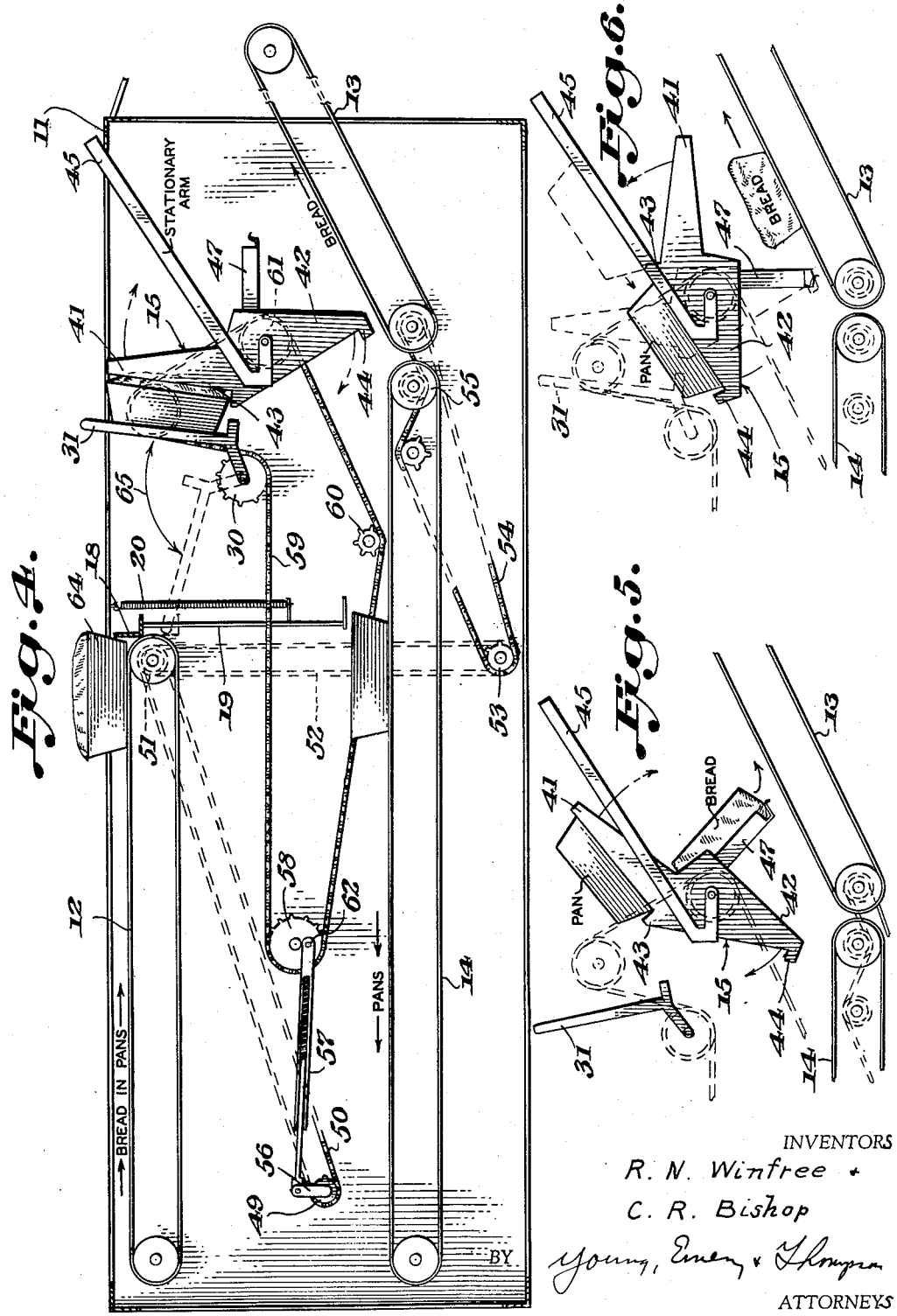
INVENTORS
R. N. Winfree &
C. R. Bishop
BY Young, Emery & Thompson
ATTORNEYS Patented July 6, 1954

2,682,961

UNITED STATES PATENT OFFICE 2,682,961

DEPANNING MACHINE

Robert N. Winfree, Lynchburg, Va., and Clare R. Bishop, Kansas City, Mo.

Application October 6, 1950, Serial No. 188,814

9 Claims. (Cl. 214—308)

1

This invention relates to a machine for depanning bread, rolls and the like for particular use in commercial bakeries where loaves of bread, which are practically continuously emerging from the baking oven or ovens, need to be removed from the pans. The machine according to the invention manipulates a series of pans or pan units of baked bread to remove the freshly baked loaves from the pans.

It is therefore an object of this invention to provide a machine with mechanism to separate and remove the loaves from the pans and automatically deliver loaves of bread on one conveyor and the empty pans on another conveyor, with both being in upright positions. A further object resides in the provision of means for automatically running filled pan units through the machine one at a time in timed cycles depending upon the capacity of the baking oven. A still further object resides in the provision of a double armed mechanism with auxiliary loaf receiving receptacles whereby one set of arms guide the pans during depanning into the receptacles and the other arms guide the empty pans onto a conveyor.

Further objects will be apparent from the following description when considered in connection with the accompanying drawings in which:

Figure 1 is a top perspective view of a portion of the machine showing the depanning mechanism, Figure 2 is a top plan view of the entire machine, Figure 3 is a perspective view of the machine showing the travel of three pan units in the machine, Figure 4 is a side elevation showing diagrammatically the depanning operation, Figures 5 and 6 are fragmentary side views illustrating diagrammatically the depanning of the loaves of bread, and Figure 7 is a perspective view of the side guide for the series of pans.

The frame 8 of the machine is suitably composed of a pair of spaced side plates 9 and 10 secured by welding or other means to a plurality of right angle members 11 which together form a rigid box-like base frame 8 for the machine.

As clearly indicated in Figure 4, the machine comprises a plurality of endless conveyors such as the bread pan conveyor 12, the loaf conveyor 13, and the empty pan conveyor 14. The machine also consists of a mechanism 15 for "knocking" or dumping the loaves of bread out of the pans indirectly onto the conveyor 13.

2

The pan units 16 are placed or run onto the bread pan conveyor 12 by any suitable mechanical means or even manually as the pan units emerge from the baking oven and are thus conveyed to abut against a pair of stop fingers 17 which operate in timed relation to release a pan unit, one at a time in a cycle timed in relation to the operation of the loaf dumping mechanism. Thus the pan units will slide on the conveyor 12 when stopped by the fingers 17 until released. Upon release of a pan unit by the fingers 17, the conveyor 12, which is preferably made of a wire metal mesh, conveys the unit against a stop bar 18 in the form of an angle iron so that the pan unit is thus in position for actuation in the loaf removal cycle. The stop bar 18 is mounted on a pair of vertical rods 19 against spring action by one or a pair of springs 20. As best shown in Figure 1, the bar 18 slides between a pair of angle bars or guideways 21 secured in each side plate 9 and 10 on the inside surface thereof.

As shown in Figures 2 and 7 a side guide rail 22 is mounted on each side of the machine adjacent the conveyor 12, each connected to a lazy-tongs lever system 23 secured in a stationary channel member 24 which latter is secured to its respective side plate. A rotatable handle 25 rotates a shaft 26 to adjust a threaded member 27 which latter is guided in a slot 28 in the member 24 by means of a pin 29. By turning the respective handles 25 the lateral distance between the two guide rails 22 can be adjusted to accommodate three or four pan units, or other sizes of pans.

Referring now to Figure 1 the loaf removal mechanism 15 comprises a shaft 38 journaled in the side frame plates 9 and 10 and having mounted thereon a sprocket wheel 30, a pair of pan unit receiving arms 31, and depending arms 32. Each arm 31 is preferably built as a double arm with two side arm bars 33 having a plurality of free running rollers 34 arranged in spaced relation between the arms 33. These rollers 34 reduce the friction of the pan units as they move onto the arms, i. e., as they are shifted from the conveyor 12 onto the arms 31. At the base of each arm 31 there is secured a stop lug or bar 35 for the pan units.

As further best shown in Figure 1, each arm 31 is provided with a side guide bar or rail 36, each having a flared out upper part 37 which guides the pan units as they slide from the conveyor 12 onto the arms 31.

A second shaft 39 is also journaled in the side plates 9 and 10 and carries a pair of double arms 40 each preferably integral as an upper arm member 41 and a lower arm member 42. Each upper arm 41 has a projecting stop rest or lug 43 and each lower arm 42 also has a projecting stop rest or lug 44. A further pair of arms 45 are secured or freely supported at one end on the shaft 39 and the other or upper end rest on the cross angle member 46, the arms 45 being loosely mounted on the shaft 39 so as not to rotate therewith. Loaf receiving receptacles 47 are mounted to rotate with the shaft 39 and they are so constructed to receive the loaves of bread as the latter are knocked or dumped out of their respective pans as will be explained.

The arms 31 are preferably keyed on the shaft 38 and are slidable laterally for adjustment toward and away from each other depending upon the length of the pan units and this is accomplished by means of the pair of depending arms 32, one for each arm 31 and cooperating with a pair of threaded spindles 48, Fig. 2, which latter may be suitably rotated to thus adjust the arms 31 relative to their distance from each other.

The three conveyors 12, 13, and 14 and the mechanism 15 are suitably driven by any desired motive element such as an electric motor, not shown. Such motor drives or rotates the sprocket wheel 49, Fig. 4, which by means of a chain drive 50 rotates a sprocket wheel 51. This sprocket 51 operates the conveyor 12 in the direction of the arrows and a second chain drive 52 rotates a sprocket 53 which drives a third chain 54 to drive the conveyor 13 in the direction of the arrows. The chain 54 also drives a sprocket 55 to thus drive the conveyor 14 in the direction of its arrows. All of the foregoing sprocket wheels rotate with complete revolutions as the conveyors travel continuously. The mechanism 15, however, carries out an oscillating movement and for that purpose a crank arm 56 rotates with the sprocket wheel 49, and by means of an arm 57, Fig. 4, causes a sprocket wheel 58 to oscillate. This in turn causes oscillation of a chain 59 which is guided by an idler sprocket 60 preferably spring pressed to keep the chain 59 from running too loose. The chain 59 drives the shafts 38 and 39 by means of sprocket wheel 30 and 61, i. e., they each rotate through a small angle to thereby cause oscillation of the arms 31, 41, and 42 for the purpose which will be explained in the operation of the machine. It will be noted that the crank arm 56 is longer than the crank arm operation on the sprocket wheel 58 due to the mounting of the pin 62 close to the center of rotation which will ensure an oscillating movement of the sprocket 58.

The arms 41 and the receptacles 47 serve a dual function in that they receive both the pans and the loaves of bread first in end position and then in inverted position while moving in one direction, that is clockwise as in Figs. 4 and 5, separate the bread from the pans and reinvert the loaves of bread while continuing in that direction, and reinverting the empty pans while moving in the opposite or counter-clockwise direction. The separation of the loaves of bread occurs when the pans strike the arms 45 so that the loaves fall out on one end to be received in the receptacles 47 in inverted positions. The loaves, however, fall out of the receptacles 47 right side up on the belt 13 from the position shown in Fig. 6.

The machine operates as follows:

The pan units 16 are manually placed on the conveyor 12 as they issue from an oven or they may be transferred onto the conveyor 12 by a separate conveyor, not shown, and these units slide on top of the conveyor as they are held back by the stop fingers 17. These fingers withdraw into the frame to release the units 16 one at a time in timed relation with each revolution of the crank 56 by any suitable mechanism, not shown. Thus a single pan unit will contact the stop bar 18 during each cycle of the machine. As the arms 31 move counter-clockwise, Fig. 1, they strike the bar 18 thus moving the latter down a short distance until the pan unit clears the bar, whereby the moving conveyor 12 will move the pan unit onto the arms 31. The unit slides or rolls down the arms 31 due to the rollers 34 until the unit abuts against the stop lugs 35 in the position as shown in Fig. 3. The arms 31, in Fig. 4, are shown in dotted lines in which position the pan unit 64 will slide down the arms 31, the pan unit and arms then moving through an angle as indicated by the arrow 65 in which position upper arm members 41 will take or receive the pan unit and move it with some force against the stationary arms 45 as shown in Fig. 5. Actually the pan unit strikes the arms 45 on a band or strap 66, Fig. 3, which secures the various pans together into the three or four pan units. In the position of Fig. 5 as a result of the unit having struck the arms 45, the loaves of bread will fall into the receptacles 47 top down with the upper surface of each loaf in its receptacle and upon further movement clock-wise from Fig. 5 to Fig. 6 the loaves will fall out of the receptacles 47 and onto the belt or conveyor 13 with the top face of each loaf up so that the loaves of bread will be conveyed out of the machine right side up. The receptacles 47 oscillate in their movements guided by the shaft 39 on which they are securely mounted.

It will be noted that in the position of Fig. 6 with the arms 41 in the position below the arms 45, the lug 43 has moved just below the upper surfaces of the arms 45 so that the empty pan unit slides down to be arrested by the lugs 44. As the arms 41 and 42 now move counter-clockwise from the position of Fig. 6 to that of Fig. 4 the empty pan unit will fall off of the lugs 44 and will land right side up on the conveyor 14 to be conveyed out of the machine. Therefore as the arms 41 move counter-clockwise to receive another filled pan unit the arms 42 are discharging an empty pan unit. The loaves of bread, therefore, emerge out of the machine right side up which is likewise true of the empty pan units.

It is, of course, obvious that the machine can handle any product for depanning but the machine is particularly adapted for the baking industry for bread, rolls and the like. Also the machine can accommodate any width tray units by the mere adjustment of the guide rails 22, by the rotation of the spindles 48 which adjust the width of the arms 33, and also, the number of receptacles 47 may be adjusted to the number of the pans of the units. The arms 33 slide on the shaft 38 during adjustment as the arms 32 are moved by the spindles 48 with the arms 32 in constant contact with the hubs of the arms 31.

The machine as described in the foregoing will take pan units of bread and the like and feed them one by one through the machine to forcibly "knock" the loaves from the pans in an approximately bottom-up position of the pans, to then run the pans right-side up from the machine and also to run the loaves of bread from the machine right-side up whereafter the loaves may be cooled and wrapped.

As described, the loaves of bread are mainly knocked out of their respective pans when the pan units strike the stationary arms 45, although some of the loaves do fall from their pans when the units contact the arms 41 of the mechanism 15. In many instances the loaves of bread will start to fall from their respective pans after the pan units pass the vertical position clockwise, Fig. 4, particularly if the loaves do not stick to the pans to any extent. In any position of the pan units during depanning the loaves will be received by the trays 47 which are in position to catch each group of loaves during each depanning cycle of the machine.

We claim as our invention:

1. A depanning machine particularly for removing freshly baked loaves of bread from pan units, comprising a frame, a conveyor for receiving the pan units to be depanned, a pair of pan unit receiving arms mounted to oscillate in the frame, a second pair of arms mounted to oscillate in the frame and having loaf receiving means associated therewith, a conveyor to receive the depanned loaves, a conveyor to receive the empty pans, and means mounted in the frame to oscillate the two pairs of arms to operate in a cycle for each pan unit, each arm of the second pair of arms being in the form of an integral pair of members rotatable about a center axis and extending approximately radially in opposite directions relative to the center axis of rotation and each member having an integral stop rest against which the pan units rest in the depanning step for one stop and the other stop in the step of depositing the empty pan units on the empty pan conveyor.

2. A depanning machine particularly for removing freshly baked loaves of bread from pan units, comprising a frame, a conveyor for receiving the pan units to be depanned, a pair of pan unit receiving arms mounted to oscillate in the frame, a second pair of arms mounted to oscillate in the frame, a conveyor to receive the depanned loaves, a conveyor to receive the empty pans, loaf receiving receptacles mounted to oscillate with the second-mentioned pair of arms to receive the loaves from the pans and deposit them right side up on the loaf receiving conveyor, and means mounted in the frame to oscillate the two pairs of arms to operate in a cycle for each pan unit.

3. A depanning machine particularly for removing freshly baked loaves of bread from pan units, comprising a frame, a conveyor for receiving the pan units to be depanned, a pair of pan unit receiving arms mounted to oscillate in the frame, a second pair of arms mounted to oscillate in the frame and having loaf receiving means associated therewith, a conveyor to receive the depanned loaves, a conveyor to receive the empty pans, means adjacent the pan unit receiving conveyor to feed the pan units one at a time to the first-mentioned receiving arms, and means mounted in the frame to oscillate the two pairs of arms to operate in a cycle for each pan unit, each arm of the second pair of arms being in the form of an integral pair of members rotatable about a center axis and extending approximately radially in opposite directions relative to the center axis of rotation and each member having an integral stop rest against which the pan units rest in the depanning step for one stop and the other stop in the step of depositing the empty pan units on the empty pan conveyor.

4. In a depanning machine for pan units containing loaves of bread, a loaf removing mechanism comprising a pair of shafts adapted to be oscillated during a cycle operation of the machine, a pair of arms mounted on one of the shafts to oscillate therewith to receive the pan units one at a time, two pairs of arms mounted to oscillate with the other shaft of which one pair of arms receives the loaf containing pans and the other pair of arms receives the empty pan units, and means for intermittently oscillating the shafts with the arms thereon.

5. In a depanning machine according to claim 4 in which ai pair of the two pairs of arms is provided with a projecting stop rest to receive the empty pans.

6. In a depanning machine according to claim 4, in which a plurality of loaf receiving receptacles are mounted on the shaft on which the two pairs of arms are mounted which oscillate with said shaft to feed the loaves out of the machine right-side up.

7. In a depanning machine according to claim 4, in which means are provided to adjust the first mentioned pair of arms to accommodate different sizes of pans.

8. In a depanning machine according to claim 4, in which a further pair of arms are provided which are rigidly mounted and which cooperate with the two pairs of arms when the latter guide the pan units to strike said further pair of arms to knock the loaves out of the pans.

9. A depanning machine particularly for removing freshly baked loaves of bread from pan units, comprising a frame, a pair of pan unit receiving arms mounted to oscillate in the frame, a second pair of arms mounted to oscillate in the frame, a conveyor to receive the depanned loaves, loaf receiving receptacles mounted to oscillate with the second-mentioned pair of arms to receive the loaves from the pans and deposit them right side up on the loaf receiving conveyor, and means mounted in the frame to oscillate the two pairs of arms to operate in a cycle for each pan unit.

References Cited in the file of this patent

UNITED STATES PATENTS

| Number | Name | Date |
|---|---|---|
| 848,736 | Glass | Apr. 2, 1907 |
| 1,561,664 | Rathwell | Nov. 17, 1925 |
| 1,588,821 | Stebler et al. | June 15, 1926 |
| 2,462,021 | Harker | Feb. 15, 1949 |